United States Patent
Li et al.

(10) Patent No.: US 7,599,124 B2
(45) Date of Patent: Oct. 6, 2009

(54) TELEPHOTO ZOOM LENS

(75) Inventors: Dayong Li, Saitama (JP); Akio Arakawa, Saitama (JP)

(73) Assignee: Tamron Co., Ltd., Saitama (JP)

( * ) Notice: Subject to any disclaimer, the term of this patent is extended or adjusted under 35 U.S.C. 154(b) by 0 days.

(21) Appl. No.: 12/071,968

(22) Filed: Feb. 28, 2008

(65) Prior Publication Data
US 2008/0212200 A1    Sep. 4, 2008

(30) Foreign Application Priority Data
Mar. 1, 2007 (JP) ............................. 2007-051816

(51) Int. Cl.
*G02B 15/14* (2006.01)
(52) U.S. Cl. ..................... 359/687; 359/676
(58) Field of Classification Search .......... 359/676, 359/686, 687
See application file for complete search history.

(56) References Cited

U.S. PATENT DOCUMENTS

| | | | |
|---|---|---|---|
| 5,309,284 A | 5/1994 | Nakatsuji | |
| 6,342,974 B1 * | 1/2002 | Usui | 359/687 |
| 6,693,750 B2 * | 2/2004 | Sato | 359/687 |
| 6,891,680 B2 * | 5/2005 | Sato | 359/687 |

FOREIGN PATENT DOCUMENTS

EP    0752605    1/1997

JP    2003-344766    12/2003

* cited by examiner

*Primary Examiner*—Darryl J Collins
(74) *Attorney, Agent, or Firm*—Jacobson Holman PLLC

(57) ABSTRACT

The present invention is directed to a compact large-aperture-ratio inner-focusing telephoto zoom lens of the reduced total lens extension where minimizing a photo-shooting distance down to as short as 1 meter does not cause the lens optics to displace accordingly greater during the focusing. The large-aperture-ratio inner-focusing telephoto zoom lens has four groups of lens pieces, namely, the 1st lens group of positive refractive power, the 2nd lens group of negative refractive power, the 3rd lens group of positive refractive power, and, the 4th lens group of positive refractive power arranged in series on the basis of "closer to a subject first," and that has the 2nd and 3rd lens groups moved along the optical axis to vary a magnification power. In such a telephoto zoom lens, the 1st lens group includes the leading subgroup of lens pieces or foremost lens subgroup G1F and the trailing subgroup of lens pieces or rear lens subgroup G1R where the G1F has two of a concave lens piece and a convex lens piece cemented into a single piece of composite lens while the G1R has a composite lens of one concave lens piece and two convex lens pieces in series. The rear lens subgroup G1R in the 1st lens group is moved along the optical axis for the focusing, and the telephoto zoom lens has an optical property that satisfies requirements as follows:

$$1.3 < f1/fw < 1.9 \qquad (1)$$

where f1 is a focal length of the 1st lens group, and fw is a focal length of the telephoto zoom lens in the wide-angle view mode.

7 Claims, 8 Drawing Sheets

TELEPHOTO ZOOM LENS

FIELD OF THE INVENTION

The present invention relates to a large-aperture telephoto zoom lens used for digital cameras, 35 mm film cameras, and the like, and more particularly, it relates to a large-aperture-ratio inner-focusing (IF) telephoto zoom lens of approximately 3× in zoom ratio, of approximately 2.8 in F number, and of an optics architecture where part of the leading or foremost group of lenses is dedicated to the focusing.

BACKGROUND ART

A type of zoom lenses, which have specifications of approximately 70 mm in focal length in the wide-angle view mode, of approximately 3× in zoom ratio, and of 2.8 in F number unvaried during the zooming, are generally comprised of first to fourth groups of lenses, that is, the 1st lens group of positive refractive power, the 2nd lens group of negative refractive power, the 3rd lens group of positive refractive power, and the 4th lens group of positive refractive power (see Patent Documents 1 and 2 listed below). Some of this type of the zoom lenses well-known in the art have only the 2nd and 3rd lens groups moved for the zooming while the 1st and 4th lens groups are stationarily halting; and they have the 1st lens group moved for the focusing (i.e., the foremost-lens focusing) or only part of the 1st lens group is moved for the focusing, which is specifically called "the foremost-lens inner-focusing."

For the purpose of downsizing the foremost-lens inner-focusing zoom lens, developed and proposed has been an optics architecture where the focusing group of lens pieces are moved even during the zooming (see Patent Document 3 listed below).

Patent Document 1 Japanese Patent No. 3266653
Patent Document 2 Japanese Patent No. 3491136
Patent Document 3 Japanese Patent No. 3397440

In the Patent Documents 1 and 2, the foremost-lens inner-focusing zoom lens, which is capable of inhibiting effects of aberration more in comparison with the foremost-lens focusing zoom lens, has its minimum photo-shooting distance ranging approximately from 1.5 meters to 1.4 meters. With the minimum photo-shooting distance reduced down to 1 meter, lens pieces are accordingly to be displaced greater for the focusing to resultantly elongate the entire lens extension. For the purpose of minimizing a diameter of the focusing group of lens pieces, the leading part and the trailing part of the 1st lens group have their respective refractivities determined so that the leading part is greater in refractivity than the trailing part. As a consequence, spherical aberration is significantly insufficiently compensated during the focusing for the macro-photographing in the telephoto view mode to resultantly bring about a degradation in performance, and the focusing for the maximized close-up photographing results in an image having its peripheral area affected by eclipse.

In the Patent Document 3, for the same purpose of reducing a diameter of the focusing group of lens pieces, the focusing lens group is moved even for the zooming, and this is prone to cause beams to be shaded to make the focused image eclipsed.

In general, the foremost-lens inner-focusing where the 1st lens group is functionally divided into the leading set of lens pieces and the trailing set of lens pieces dedicated to the focusing has been widely incorporated in large-aperture-ratio telephoto zoom lens designs. With such a large-aperture-ratio telephoto zoom lens, a displacement of the 1st lens group must be increased to take a picture at a shorter object distance, and accordingly the entire extension of the first lens group is elongated. The trailing set of lens pieces, if they have an increased refractivity for the purpose of reducing the displacement of the 1st lens group, become greater in curvature of radius and have a larger thickness to ensure a sufficient lens diameter, and this should unavoidably cause the lens to be enlarged in radial directions. If the lens optics is downsized by an approach that the remaining lens groups other than the 1st lens group have their respective refractivities increased, greater effects of spherical aberration are adversely caused, and additionally a curvature of field is exaggerated.

The present invention is made to overcome the aforementioned disadvantages in the prior art large-aperture-ratio inner-focusing telephoto zoom lens, and accordingly, it is an object of the present invention to provide a compact large-aperture-ratio inner-focusing telephoto zoom lens of the reduced total lens extension where minimizing a photo-shooting distance down to as short as 1 meter does not cause the lens optics to displace accordingly greater during the focusing.

It is another object of the present invention to provide a large-aperture-ratio inner-focusing telephoto zoom lens that is capable of sufficiently compensating for spherical aberration during the focusing for the macro-photographing in the telephoto view mode without having a resultant image affected by eclipse during the focusing for the maximized close-up photographing.

It is still another object of the present invention to provide a large-aperture-ratio inner-focusing telephoto zoom lens that can avoid shading beams as a result of moving the focusing lens during the zooming so as not to make the focused image eclipsed.

SUMMARY OF THE INVENTION

The present invention provides a large-aperture-ratio inner-focusing telephoto zoom lens that has four groups of lens pieces, namely, the 1st lens group of positive refractive power, the 2nd lens group of negative refractive power, the 3rd lens group of positive refractive power, and, the 4th lens group of positive refractive power arranged in series on the basis of "closer to a subject first," and that has the 2nd and 3rd lens groups moved along the optical axis to vary a magnification power.

In such a telephoto zoom lens, the 1st lens group includes the leading subgroup of lens pieces or foremost lens subgroup G1F and the trailing subgroup of lens pieces or rear lens subgroup G1R where the G1F has two of a concave lens piece ("concave lens piece" being used here synonymously with "bi-convex lens" or "positive lens") and a convex lens piece ("convex lens piece" being used here synonymously with "bi-concave lens" or "negative lens") cemented into a single piece of composite lens while the G1R has a composite lens of one concave lens piece and two convex lens pieces in series. The rear lens subgroup G1R is moved along the optical axis for the focusing, and the telephoto zoom lens has an optical property that satisfies requirements as follows:

$$1.3 < f1/fw < 1.9 \tag{1}$$

where f1 is a focal length of the 1st lens group, and fw is a focal length of the telephoto zoom lens in the wide-angle view mode.

In an aspect of the present invention, the leading subgroup of lens pieces or foremost lens subgroup G1F in the 1st lens group has a concave lens piece and a convex lens piece cemented into a single piece of composite lens, and the large-aperture-ratio inner-focusing telephoto zoom lens has an optical property that satisfies requirements as follows:

$$-20.0 < f11/fw < -9.5 \quad (2)$$

where f11 is a focal length of the foremost lens subgroup G1F.

The trailing subgroup of lens pieces or rear lens subgroup G1R in the 1st lens group has one concave lens piece and two convex lens pieces in series, and the large-aperture-ratio inner-focusing telephoto zoom lens has an optical property that satisfies requirements as follows:

$$75.0 < R1R < 140.0 \quad (3)$$

where R1R is a curvature of radius of a front surface of the concave lens closer to the subject.

In another aspect of the present invention, the leading subgroup of lens pieces or foremost lens subgroup G1F in the 1st lens group has a concave lens piece and a convex lens piece cemented into a single piece of composite lens, and the large-aperture-ratio inner-focusing telephoto zoom lens has an optical property that satisfies requirements as follows:

$$9.0 < |f11|/fw < 20.0 \quad (4)$$

where f11 is a focal length of the foremost lens subgroup G1F.

In still another aspect of the present invention, the large-aperture-ratio inner-focusing telephoto zoom lens has an optical property that satisfies requirements as follows:

$$62.0 < vn1 < 100 \quad (5)$$

where vn1 is an Abbe's number of the convex lens of the foremost lens subgroup G1F in the 1st lens group.

In further another aspect of the present invention, the large-aperture-ratio inner-focusing telephoto zoom lens includes more than one convex lenses belonging to the 3rd and 4th lens groups, and at least one of the convex lenses has an optical property that satisfies requirements as follows:

$$62.0 < v < 100 \quad (6)$$

In yet another aspect of the present invention, the large-aperture-ratio inner-focusing telephoto zoom lens has an aperture stop located in the 4th lens group.

In accordance with the present invention, the large-aperture-ratio inner-focusing telephoto zoom lens minimizes a photo-shooting distance down to as short as 1 meter without causing the lens optics to displace accordingly greater during the focusing, and it attains a compact body due to a reduced total lens extension, having approximately 3× magnification power and approximately 2.8 F number.

Also, in accordance with the present invention, the large-aperture-ratio inner-focusing telephoto zoom lens is capable of sufficiently compensating for spherical aberration during the focusing for the macro-photographing in the telephoto view mode without having a resultant image affected by eclipse during the focusing for the maximized close-up photographing.

In addition, the large-aperture-ratio inner-focusing telephoto zoom lens according to the present invention can avoid shading beams as a result of moving the focusing lens during the zooming so as not to make the focused image eclipsed.

<Description of the Requirements for the Optics Design>

The large-aperture-ratio inner-focusing telephoto zoom lens according to the present invention has the 1st lens group of positive refractive power, the 2nd lens group of negative refractive power, the 3rd lens group of positive refractive power, and, the 4th lens group of positive refractive power arranged in series on the basis of "closer to a subject first," and this zoom lens has its magnification power varied from a focal point in the wide-angle view mode to that in the telephoto view mode by moving the 2nd and 3rd lens groups along the optical axis. The 1st lens group includes the leading subgroup of lens pieces or foremost lens subgroup G1F and the trailing subgroup of lens pieces or rear lens subgroup G1R where the G1F has a concave lens piece and a convex lens piece cemented into a single piece of composite lens while the G1R has a composite lens of one concave lens piece and two convex lens pieces in series. The telephoto zoom lens is a so-called "inner focusing" type that moves the rear lens subgroup G1R along the optical axis to bring an image in focus.

Referring back to the formula (1), $$1.3 < f1/fw < 1.9$$

f1 is a focal length of the 1st lens group, and fw is a focal length of the telephoto zoom lens in the wide-angle view mode. When f1/fw exceeds the upper limit as defined in the formula (1), the 1st lens group has its refractive power damped, and therefore, it is unavoidable that the lens optics as a whole be increased in size. When f1/fw exceeds the lower limit, the rear lens subgroup G1R serving as a focusing lens has its refractive power enhanced, and it is undesirable that the focusing results in greater adverse effects of spherical aberration.

In the 1st lens group, the foremost lens subgroup G1F halts stationarily during the focusing although the rear lens subgroup G1R is moved for the purpose of the focusing. The foremost group is a composite lens where a concave lens piece and a convex lens piece are cemented into a single lens element so as to inhibit adverse effects caused by chromatic aberration due to the focusing, and for the same purpose, the rear lens subgroup G1R is similarly of three-piece cemented composite lens of both concave and convex lens pieces.

Referring back to the formula (2), $$-20.0 < f11/fw < -9.5$$

it appropriately defines the refractive power of the foremost lens subgroup G1F in the 1st lens group. The foremost lens subgroup G1F is configured to be a cemented composite lens of both concave and convex lens pieces for the purpose of compensating for chromatic aberration, and it also configured to exert negative refractive power so as to avoid shading beams to have the focused image without effects of eclipse and also to reduce a displacement of the lens required for the focusing when an object distance is reduced for the macro-photographing. The foremost lens subgroup G1F, being of negative refractive power, tends to divert beams, and this effectively avoid the effects of eclipse if the object distance is reduced down to as short as 0.95 m. When f11/fw exceeds the upper limit as defined in the formula (2), the foremost lens subgroup diverts the beams more, and accordingly, the rear lens subgroup G1R must have its lens diameter enlarged. Also, accordingly, the rear lens subgroup G1R is to augment its refractive power, and this results in the greater effects of spherical aberration during the focusing. When f11/fw exceeds the lower limit as defined in the formula (2), the foremost lens subgroup G1R has its negative refractive power diminished, and accordingly, the rear lens subgroup G1R has its positive refractive power damped, which causes the increased displacement of the lens groups for the focusing, so that the lens optics as a whole should be increased in size.

Referring back to the formula (3), $$75.0 < R1R < 140.0$$

defined herein are the requirements for reducing a curvature of filed as a result of the focusing under the settings where the 1st lens group is configured to have the foremost lens subgroup G1F of negative refractive power so that the reduced object distance no longer bring about the adverse effects of eclipse, and that the displacement of the lens optics can be reduced during the focusing. When R1R exceeds the upper limit as defined in the formula (3), the telephoto zoom lens fails to sufficiently compensate for astigmatism. When R1R exceeds the lower limit as defined in the formula (3), the lens pieces of the rear lens subgroup should be increased in thickness, and the lens optics as a whole is to be increased in size.

Referring back to the formula (4), $$9.0 < |f11|/fw < 20.0$$

the requirements in the formula are for the settings where the 1st lens group is configured to have the foremost lens subgroup G1F of negative refractive power so that the reduced object distance no longer bring about the adverse effects of eclipse, and that the displacement of the lens optics can be reduced during the focusing. The object distance with the foremost lens subgroup G1F of positive refractive power is longer than that with G1F of negative refractive power. If the $|f11|/fw$ falls within a range as defined in the formula (4), the object distance with the foremost lens subgroup G1F of positive refractive power could be almost the same as that with G1F of negative refractive power, and the lens optics is inhibited from being displaced longer for the focusing. The telephoto zoom lens configured to have the foremost lens subgroup G1F of positive refractive power enables the lens pieces of the subgroup G1F to be reduced in diameter.

Referring back to the formula (5), $$65.0 < vn1 < 100$$

provided herein are the requirements for inhibiting secondary chromatic aberration from occurring in the 1st lens group. The upper limit defined in the formula (5) is a threshold of all the existing types of visible light optical glass, and when vn1 exceeds the upper limit, the present invention does not work in practice. The optical glass available under the condition of vn1 exceeding the lower limit causes increasingly adverse effects of the secondary chromatic aberration.

Referring back to the formula (6), $$62.0 < v < 100$$

provided herein are the requirements for inhibiting secondary chromatic aberration from occurring in the 3rd and 4th lens groups, especially for inhibiting chromatic aberration in the wide-angle view mode. The upper limit as defined in the formula (6) is a threshold of all the existing types of visible light optical glass, and when v exceeds the upper limit, it is undesirable to use such a lens optics since it is far beyond an applicability in the art related to the present invention. The optical glass available under the condition of v exceeding the lower limit causes excessively adverse effects of the secondary chromatic aberration.

An aperture stop is located behind the 3rd lens group to avoid shading beams so as not to cause adverse effects of eclipse when the object distance is reduced. Since the foremost lens subgroup G1F in the 1st lens group has its refractive power diminished, the aperture stop can be positioned in the 4th lens group. Moreover, since the lens pieces of the 4th lens group converge the beams, the aperture stop located there can have its aperture diameter reduced, which resultantly attains a more compact lens optics as a whole.

DETAILED DESCRIPTION OF THE BEST MODE

EMBODIMENT 1

Figure 1:
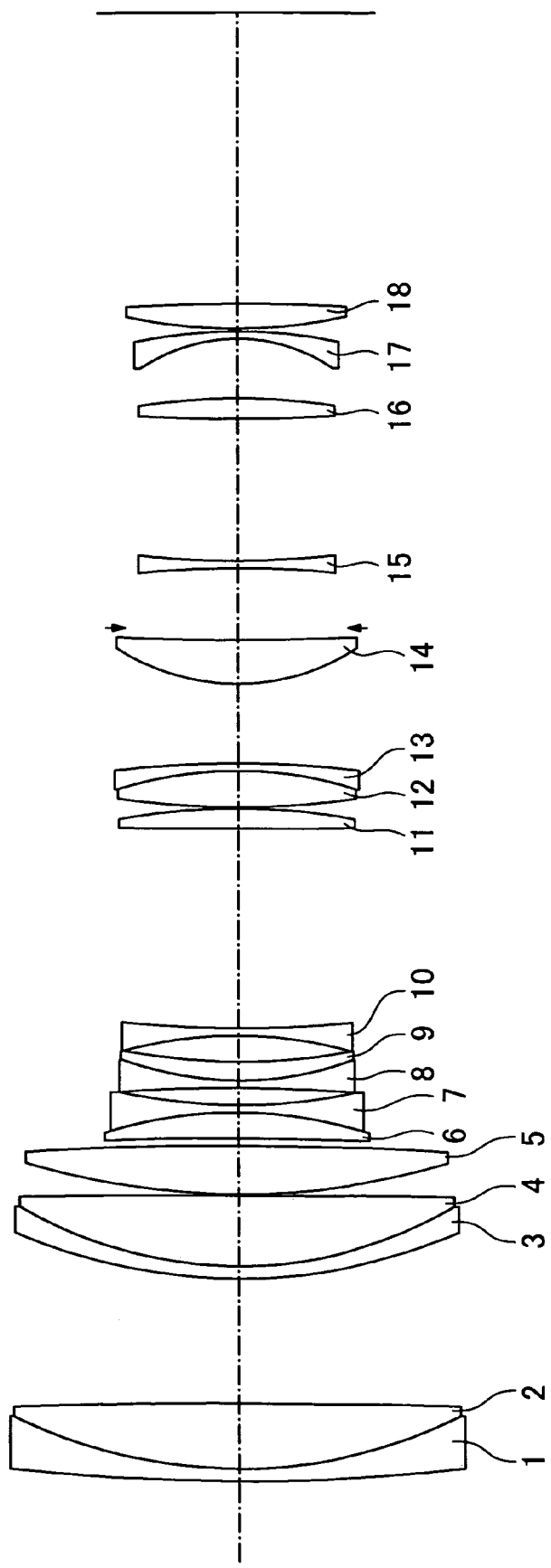
FIG. 1 is a sectional view of an embodiment of a zoom lens in the wide-angle view mode according to the present invention.

An embodiment of a zoom lens of the present invention is, as shown in the sectional view of FIG. 1, comprised of eighteen lens pieces, namely, the 1st lens element 1 to the eighteenth lens element 18. They work in four groups, namely, the 1st lens group to the 4th lens group, and the 1st lens group G1 works in two subgroups, namely, the leading or foremost lens subgroup G1F in the 1st lens element 1 and 2nd lens element 2, and the trailing or rear lens subgroup G1R of the 3rd lens element 3 to the 5th lens element 5. The 2nd lens group G2 has the 6th lens element 6 to the 10th lens element 10. The 3rd lens group G3 has the 11th lens element 11 to the 13th lens element 13. The 4th lens group G4 has the 14th lens element 14 to the 18th lens element 18.

In the following lookup table, f is a focal length (mm), Fno is an F number, and, $2\bar{\omega}$ is a coverage angle. Numerals in the first column of the table labeled with NO are surface numbers of the lens pieces, those in the second column designated by R are curvatures of radius (mm) corresponding to the surface numbers, corresponding lens thicknesses and clearances filled with air in the third column designated by D, corresponding refractivities for yellow light or d-line (wavelength $\lambda$=587.6 nm) in the fourth column labeled with Nd, and Abbe's numbers in the fifth column v d A coefficient "d" in the third column represents a clearance filled with air that is altered depending upon a variable magnification power. Reference symbol "STOP" denotes an aperture stop.

f=71.5~117.4~194.0 (in millimeters)
Fno=2.88
$2\bar{\omega}$=35.0~20.8~12.4 (in degrees)

| NO | R | D | Nd | vd |
|---|---|---|---|---|
| 1 | 336.3205 | 2.000 | 1.78590 | 43.9 |
| 2 | 78.4246 | 10.582 | 1.48749 | 70.4 |
| 3 | −1004.7183 | d3 | 1.00000 | |
| 4 | 87.2384 | 2.000 | 1.69895 | 30.1 |
| 5 | 66.6285 | 11.387 | 1.48749 | 70.4 |
| 6 | −2110.6560 | 0.200 | 1.00000 | |
| 7 | 114.6596 | 7.805 | 1.49700 | 81.6 |

-continued

| NO | R | D | Nd | vd |
|---|---|---|---|---|
| 8 | −532.5578 | d8 | 1.00000 | |
| 9 | −495.1986 | 4.174 | 1.84666 | 23.8 |
| 10 | −67.1510 | 1.200 | 1.64000 | 60.2 |
| 11 | 88.0318 | 2.754 | 1.00000 | |
| 12 | −233.3123 | 1.200 | 1.64000 | 60.2 |
| 13 | 51.9905 | 3.044 | 1.84666 | 23.8 |
| 14 | 97.6171 | 4.178 | 1.00000 | |
| 15 | −66.3984 | 1.200 | 1.78590 | 43.9 |
| 16 | 178.6227 | d16 | 1.00000 | |
| 17 | 2391.1738 | 3.258 | 1.80610 | 40.7 |
| 18 | −100.7101 | 0.200 | 1.00000 | |
| 19 | 132.6524 | 5.852 | 1.49700 | 81.6 |
| 20 | −61.1716 | 1.200 | 1.84666 | 23.8 |
| 21 | −160.2407 | d21 | 1.00000 | |
| 22 | 34.6669 | 7.041 | 1.49700 | 81.6 |
| 23 | 391.7479 | 1.927 | 1.00000 | |
| 24 | STOP | 9.645 | 1.00000 | |
| 25 | −162.8613 | 1.200 | 1.62004 | 36.3 |
| 26 | 141.7540 | 22.815 | 1.00000 | |
| 27 | 267.9086 | 3.303 | 1.83400 | 37.3 |
| 28 | −99.3972 | 9.536 | 1.00000 | |
| 29 | −27.1236 | 1.200 | 1.80610 | 33.3 |
| 30 | −77.3739 | 0.433 | 1.00000 | |
| 31 | 80.0747 | 4.025 | 1.62004 | 36.3 |
| 32 | −293.1170 | 46.696 | 1.00000 | |

Altered Clearance Depending upon Magnification Power

| f | 71.5 | 117.4 | 194.0 |
|---|---|---|---|
| d3 | 20.101 | 20.101 | 20.101 |
| d8 | 1.196 | 23.894 | 37.806 |
| d16 | 32.139 | 20.845 | 2.041 |
| d21 | 12.812 | 1.408 | 6.300 |

9.124-mm Displacement of the Lens Optics at 0.95-m Object Distance f1=106.23
f2=31.88
f3=85.91
f4=10785
f11=1031.59
f12=99.40
fw=71.50
ft=194.00
R1R=872384
vn1=70.4
v=81.6

Figure 2:
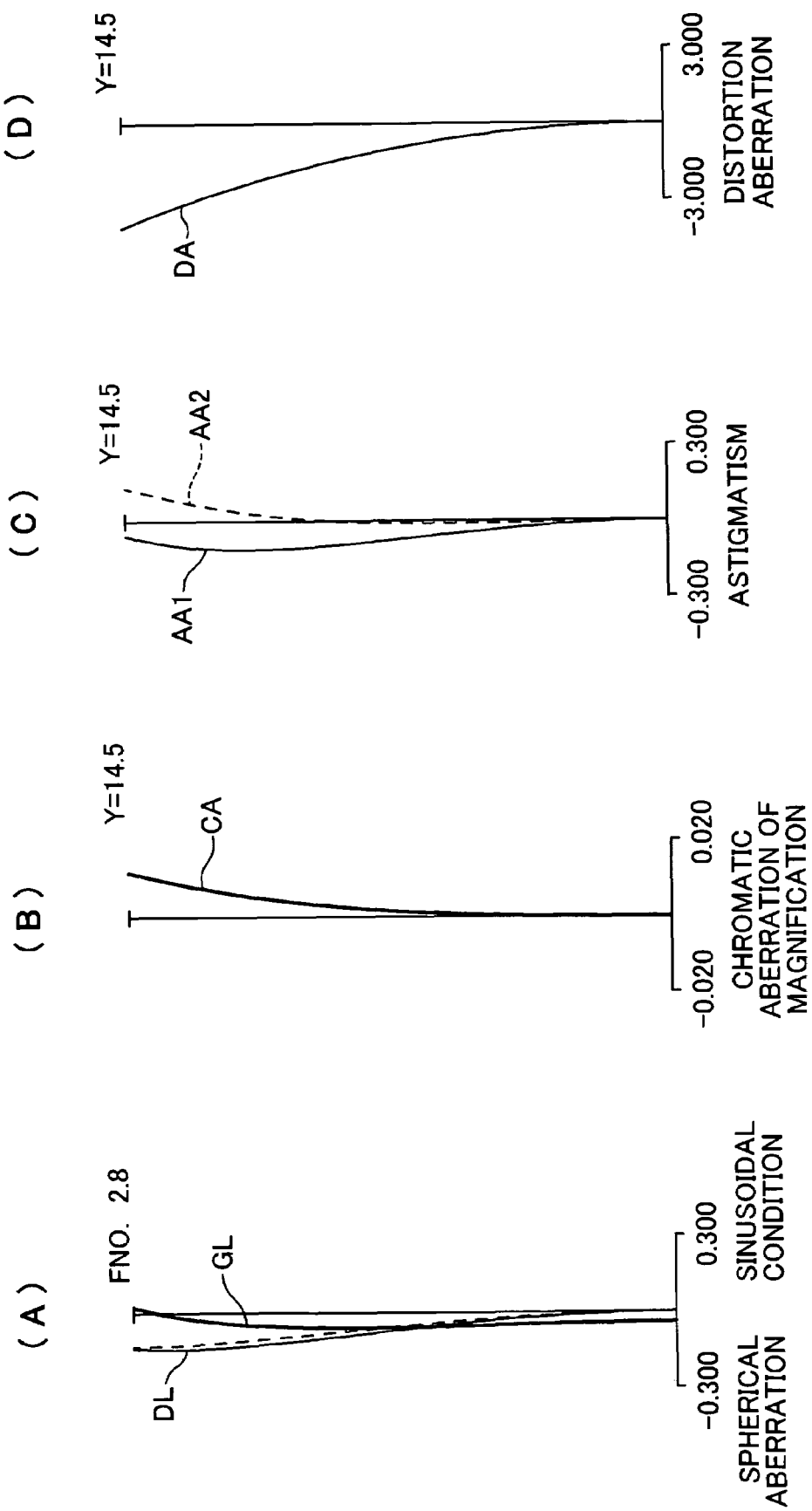
FIG. 2 illustrates various types of aberration caused in the exemplary zoom lens in the wide-angle-view infinity mode.

Spherical aberrations and sinusoidal conditions of the exemplary zoom lens in the wide-angle-view infinity mode are as shown in FIG. 2(A) where Fno is an F number. Graph DL illustrates aberrations related to yellow light or d-line (587.56 nm). Graph GL illustrates the aberrations related to violet light or g-line (435.83 nm). The graph of broken line represents sinusoidal conditions.

Chromatic aberrations of magnification of the zoom lens in the wide-angle-view infinity mode are as shown in FIG. 2(B). An image height Y is 14.5 mm. Graph CA illustrates chromatic aberrations of magnification related to the g-line (435.83 nm) in contrast with the d-line (587.56 nm).

Astigmatisms of the zoom lens in the wide-angle-view infinity mode are as shown in FIG. 2(C). The image height Y is 14.5 mm. Solid line AA1 represents sagittal directions of the d-line (587.56 nm) while broken line AA2 depicts meridional direction of the d-line (587.56 nm).

Distortion aberrations of the zoom lens in the wide-angle-view infinity mode are as shown in FIG. 2(D). The image height Y is 14.5 mm. Solid line DA represents the distortion aberrations related to the d-line (587.56 nm).

Figure 3:
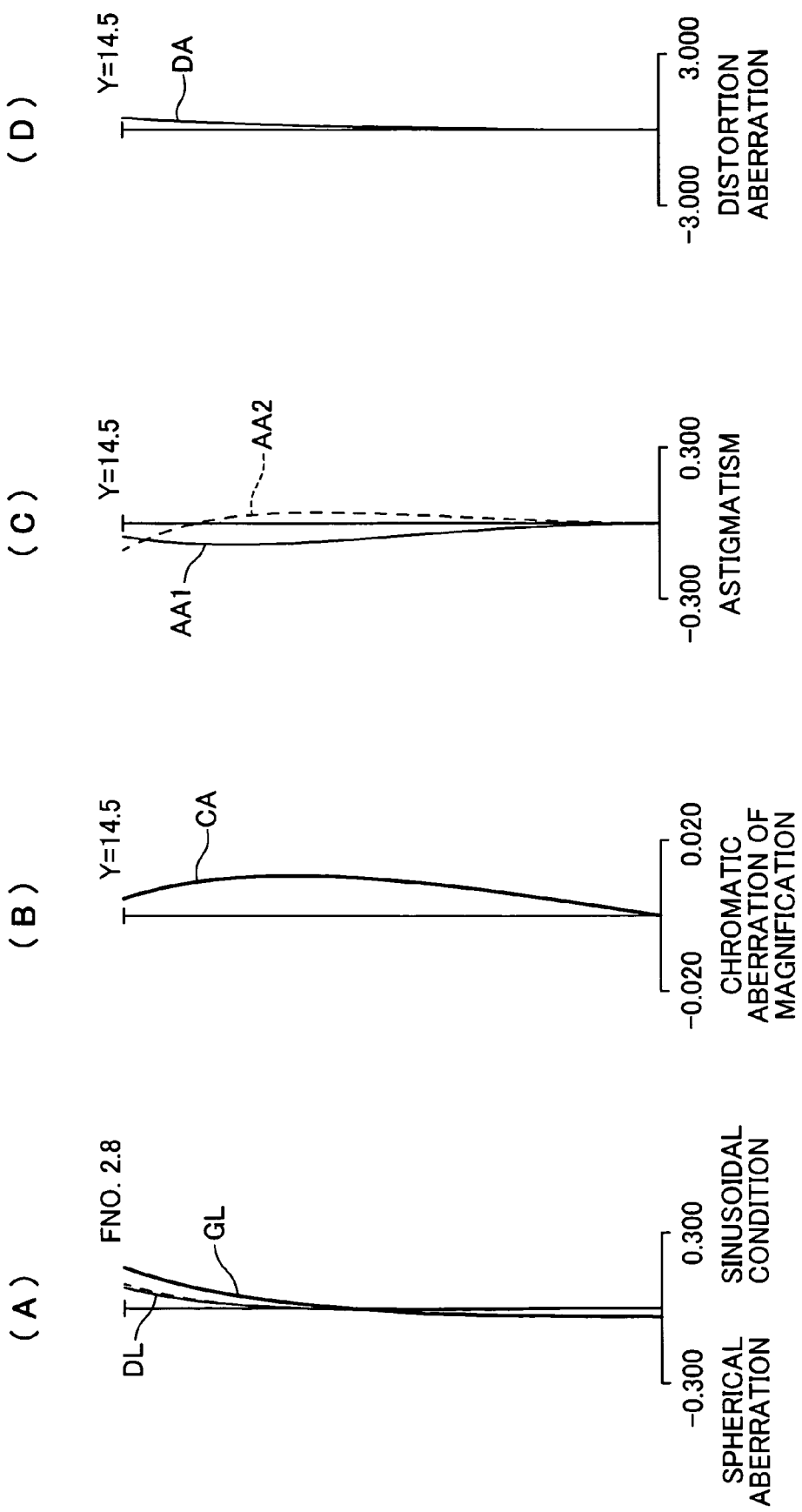
FIG. 3 illustrates various types of aberration caused in the exemplary zoom lens in the intermediate-zooming-range infinity mode.

Spherical aberrations and sinusoidal conditions of the exemplary zoom lens in the intermediate-zooming-range infinity mode are as shown in FIG. 3(A). Chromatic aberrations of magnification of the zoom lens in the intermediate-zooming-range infinity mode are as shown in FIG. 3(B). Astigmatisms of the zoom lens in the intermediate-zooming-range infinity mode are as shown in FIG. 3(C). Distortion aberrations of the zoom lens in the intermediate-zooming-range infinity mode are as shown in FIG. 3(D). Depicting ways of the aberration graphs are the same as those of FIGS. 2(A) and (B).

Figure 4:
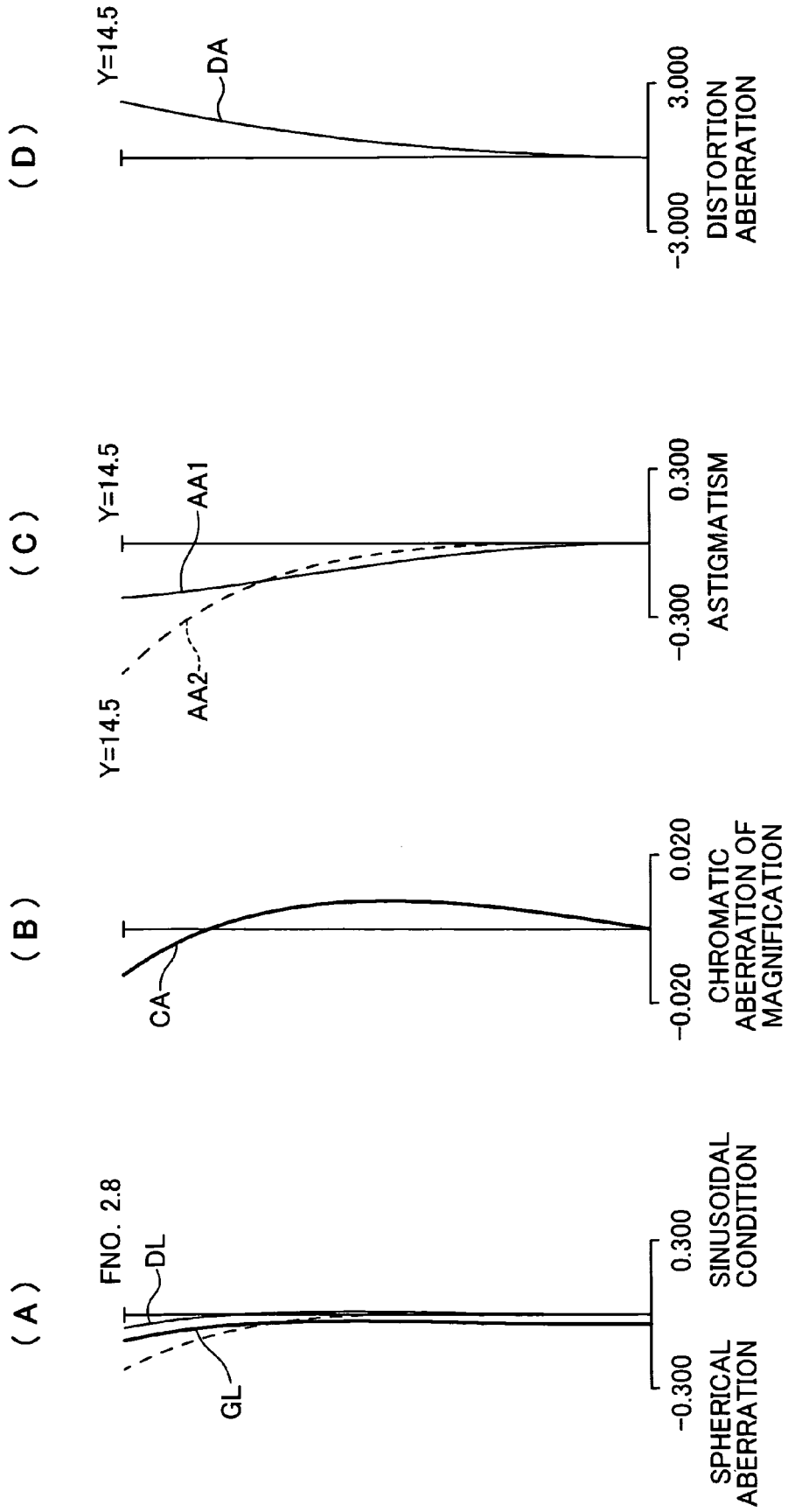
FIG. 4 illustrates various types of aberration caused in the exemplary zoom lens in the telephoto-view infinity mode.

Spherical aberrations and sinusoidal conditions of the exemplary zoom lens in the telephoto-view infinity mode are as shown in FIG. 4(A). Chromatic aberrations of magnification of the zoom lens in the telephoto-view infinity mode are as shown in FIG. 4(B). Astigmatisms of the zoom lens in the telephoto-view infinity mode are as shown in FIG. 4(C). Distortion aberrations of the zoom lens in the telephoto-view infinity mode are as shown in FIG. 4(D). Depicting ways of the aberration graphs are the same as those of FIGS. 2(A) and (B).

EMBODIMENT 2

Figure 5:
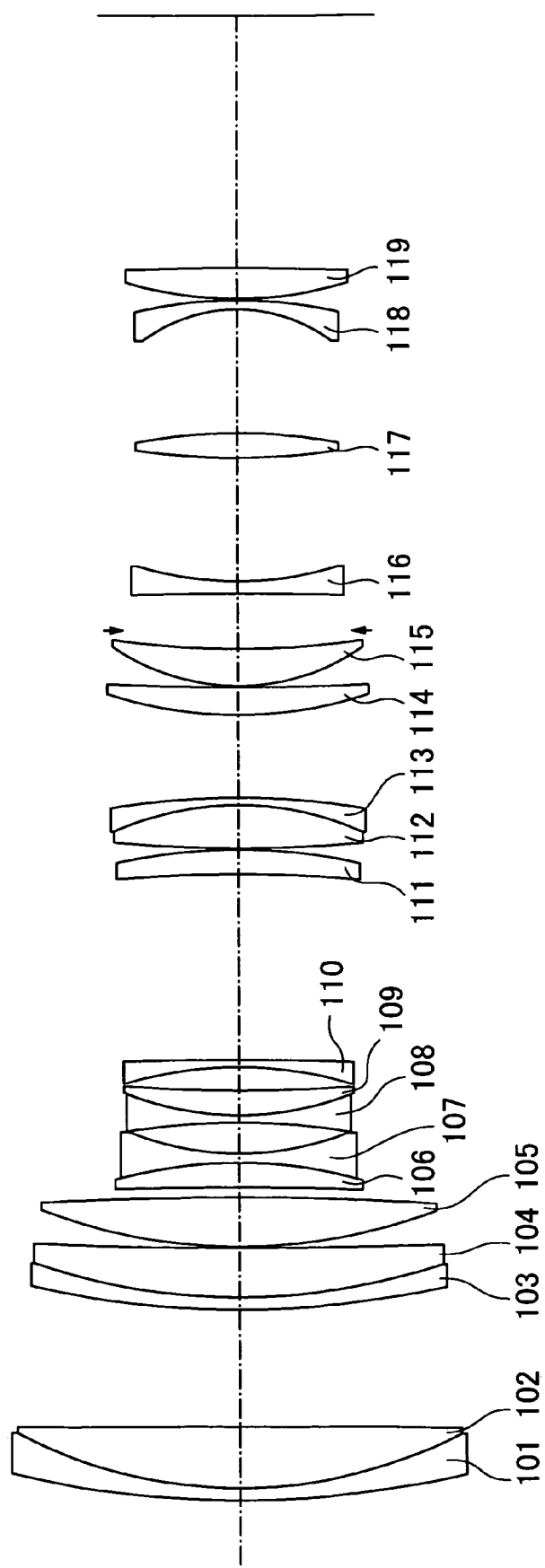
FIG. 5 is a sectional view of another embodiment of the zoom lens in the wide-angle view mode according to the present invention.

Another embodiment of the zoom lens of the present invention is, as shown in the sectional view of FIG. 5, comprised of nineteen lens pieces, namely, the 1st lens element 101 to the nineteenth lens element 119. They work in four groups, namely, the 1st lens group to the 4th lens group, and the 1st lens group G101 works in two subgroups, namely, the leading or foremost lens subgroup G101F of the 1st lens element 101 and 2nd lens element 102, and the trailing or rear lens subgroup G101R of the 3rd lens element 103 to the 5th lens element 105. The 2nd lens group G102 has the 6th lens element 106 to the 10th lens element 110. The 3rd lens group G103 has the 11th lens element 111 to the 13th lens element 113. The 4th lens group G104 has the 14th lens element 114 to the 19th lens element 119.

f=71.5~116.9~194.0 (in millimeters)
Fno=2.88
$2\overline{\omega}$=35.0~21.0~12.5 (in degrees)

| NO | R | D | Nd | vd |
|---|---|---|---|---|
| 1 | 153.7735 | 2.00 | 1.77250 | 49.6 |
| 2 | 74.6839 | 10.00 | 1.48749 | 70.2 |
| 3 | −4608.9863 | d3 | 1.00000 | |
| 4 | 147.3139 | 2.00 | 1.80518 | 25.4 |
| 5 | 99.4765 | 8.00 | 1.49700 | 81.6 |
| 6 | 845.5814 | 0.20 | 1.00000 | |
| 7 | 86.2302 | 8.00 | 1.49700 | 81.6 |
| 8 | −537.2767 | d8 | 1.00000 | |
| 9 | −750.6938 | 4.00 | 1.80518 | 25.4 |
| 10 | −71.8458 | 1.50 | 1.77250 | 49.6 |
| 11 | 45.2761 | 5.00 | 1.00000 | |
| 12 | −112.0637 | 1.20 | 1.48749 | 70.2 |
| 13 | 47.1833 | 4.00 | 1.80518 | 25.4 |
| 14 | 216.6493 | 3.80 | 1.00000 | |
| 15 | −62.1003 | 1.20 | 1.77250 | 49.6 |
| 16 | −600.9493 | d16 | 1.00000 | |
| 17 | −221.4068 | 4.00 | 1.69680 | 55.5 |
| 18 | −86.3703 | 0.20 | 1.00000 | |
| 19 | 213.1997 | 7.00 | 1.51633 | 64.2 |
| 20 | −47.6529 | 1.20 | 1.71736 | 29.5 |

-continued

| NO | R | D | Nd | vd |
|---|---|---|---|---|
| 21 | −120.4839 | d21 | 1.00000 | |
| 22 | 65.3145 | 4.50 | 1.48749 | 70.2 |
| 23 | 462.6483 | 0.20 | 1.00000 | |
| 24 | 34.3915 | 6.00 | 1.49700 | 81.6 |
| 25 | 136.2786 | 3.00 | 1.00000 | |
| 26 | STOP | 6.00 | 1.00000 | |
| 27 | −528.3799 | 2.00 | 1.64769 | 33.8 |
| 28 | 53.4868 | 20.00 | 1.00000 | |
| 29 | 112.8329 | 4.00 | 1.51633 | 64.2 |
| 30 | −82.7673 | 20.00 | 1.00000 | |
| 31 | −24.5534 | 1.50 | 1.77250 | 49.6 |
| 32 | −67.5273 | 0.2 | 1.00000 | |
| 33 | 60.5735 | 5.00 | 1.62004 | 36.3 |
| 34 | −387.9204 | 40.756 | 1.00000 | |

| Altered Clearance Depending upon Magnification Power | | | |
|---|---|---|---|
| f | 71.5 | 116.9 | 194.0 |
| d3 | 18.880 | 18.990 | 18.990 |
| d8 | 1.588 | 22.737 | 36.836 |
| d16 | 30.121 | 20.577 | 2.672 |
| d21 | 13.421 | 1.816 | 5.622 |

17.062-mm Displacement of the Lens Optics at 1-m Object Distance
f1=107.72
f2=−30.50
f3=110.00
f4=88.77
f11=750.00
f2=120.00
fw=71.50
ft=194.00
R1R=147.3139
vn1=70.2
v=81.6

Figure 6:
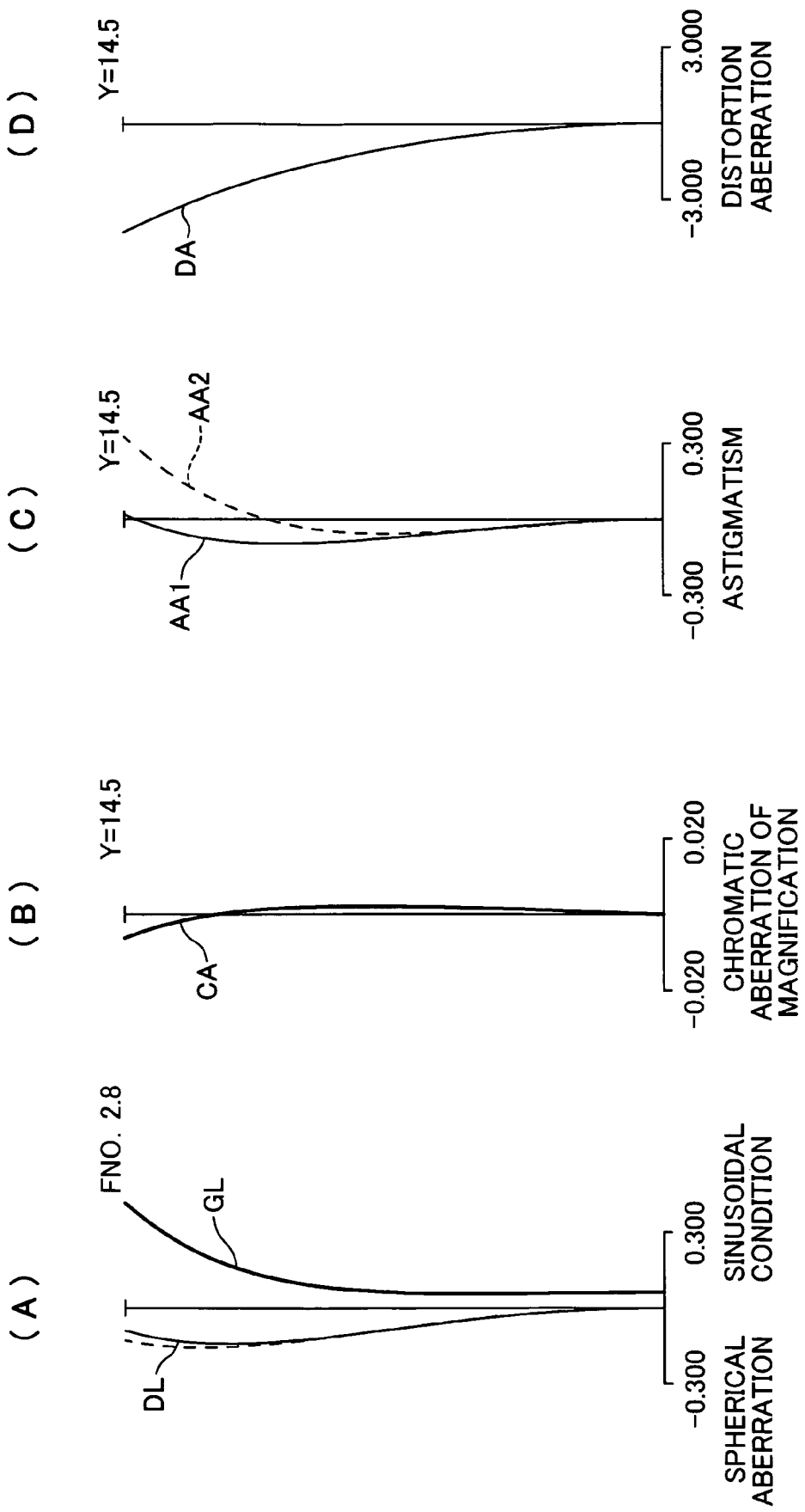
FIG. 6 illustrates various types of aberration caused in the exemplary zoom lens in the wide-angle-view infinity mode.

Spherical aberrations and sinusoidal conditions of the exemplary zoom lens in the wide-angle-view infinity mode are as shown in FIG. 6(A). Graph DL illustrates aberrations related to yellow light or d-line (587.56 nm). Graph GL illustrates the aberrations related to violet light or g-line (435.83 nm). The graph of broken line represents sinusoidal conditions.

Chromatic aberrations of magnification of the zoom lens in the wide-angle-view infinity mode are as shown in FIG. 6(B). An image height Y is 14.5 mm. Graph CA illustrates chromatic aberrations of magnification related the g-line (435.83 nm) in contrast with to the d-line (587.56 nm).

Astigmatisms of the zoom lens in the wide-angle-view infinity mode are as shown in FIG. 6(C). The image height Y is 14.5 mm. Solid line AA1 represents sagittal directions of the d-line (587.56 nm) while broken line AA2 depicts meridional direction of the d-line (587.56 nm).

Distortion aberrations of the zoom lens in the wide-angle-view infinity mode are as shown in FIG. 6(D). The image height Y is 14.5 mm. Solid line DA represents the distortion aberrations related to the d-line (587.56 nm).

Figure 7:
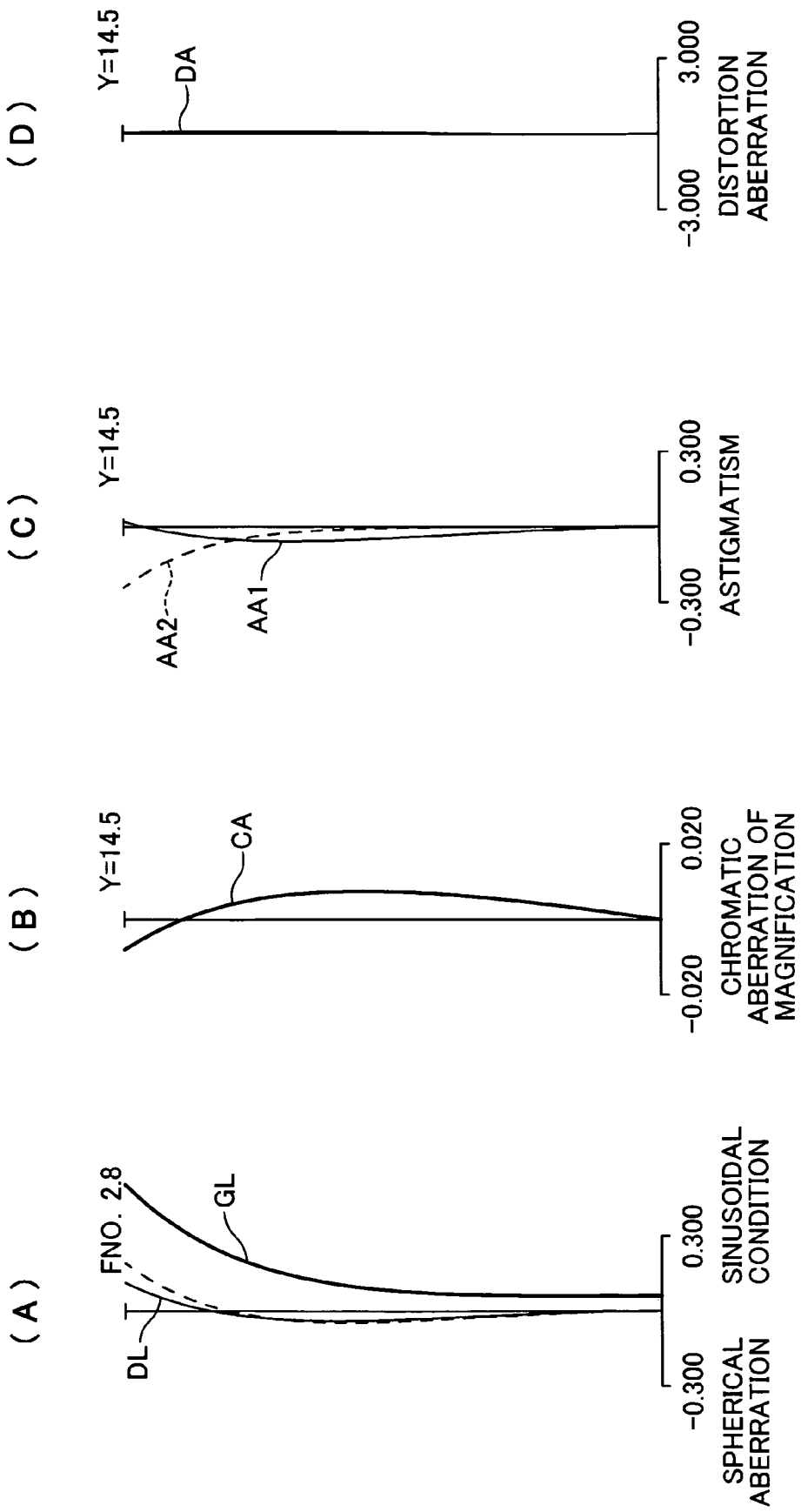
FIG. 7 illustrates various types of aberration caused in the exemplary zoom lens in the intermediate-zooming-range infinity mode.

Spherical aberrations and sinusoidal conditions of the exemplary zoom lens in the intermediate-zooming-range infinity mode are as shown in FIG. 7(A). Chromatic aberrations of magnification of the zoom lens in the intermediate-zooming-range infinity mode are as shown in FIG. 7(B). Astigmatisms of the zoom lens in the intermediate-zooming-range infinity mode are as shown in FIG. 7(C). Distortion aberrations of the zoom lens in the intermediate-zooming-range infinity mode are as shown in FIG. 7(D). Depicting ways of the aberration graphs are the same as those of FIGS. 6(A) and (B).

Figure 8:
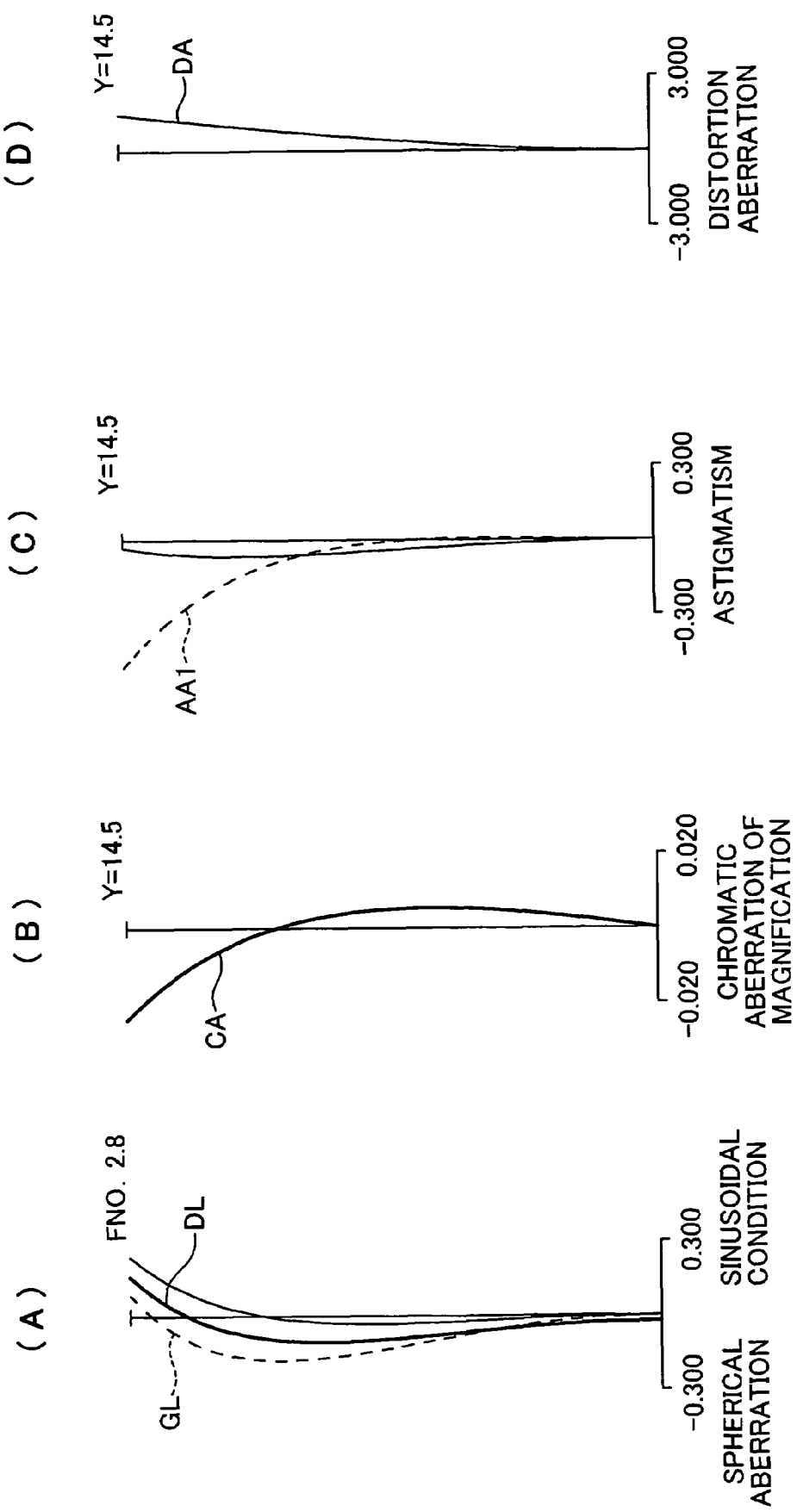
FIG. 8 illustrates various types of aberration caused in the exemplary zoom lens in the telephoto-view infinity mode.

Spherical aberrations and sinusoidal conditions of the exemplary zoom lens in the telephoto-view infinity mode are as shown in FIG. 8(A). Chromatic aberrations of magnification of the zoom lens in the telephoto-view infinity mode are as shown in FIG. 8(B). Astigmatisms of the zoom lens in the telephoto-view infinity mode are as shown in FIG. 8(C). Distortion aberrations of the zoom lens in the telephoto-view infinity mode are as shown in FIG. 8(D). Depicting ways of the aberration graphs are the same as those of FIGS. 6(A) and (B).

What is claimed is:

1. In a large-aperture-ratio inner-focusing telephoto zoom lens that has four groups of lens pieces, namely, the 1st lens group of positive refractive power, the 2nd lens group of negative refractive power, the 3rd lens group of positive refractive power, and, the 4th lens group of positive refractive power arranged in series on the basis of "closer to a subject first," and that has the 2nd and 3rd lens groups moved along the optical axis to vary a magnification power, the 1st lens group includes the leading subgroup of lens pieces or foremost lens subgroup G1F and the trailing subgroup of lens pieces or rear lens subgroup G1R where the G1F has two of a negative lens and a positive lens cemented into a single piece of composite lens while the G1R has a composite lens of one negative lens and two positive lenses in series, and the rear lens subgroup G1R is moved along the optical axis for the focusing, and the telephoto zoom lens has an optical property that satisfies requirements as follows:

$$1.3 < f1/fw < 1.9 \quad (1)$$

where f1 is a focal length of the 1st lens group, and fw is a focal length of the telephoto zoom lens in the wide-angle view mode.

2. A large-aperture-ratio inner-focusing telephoto zoom lens according to claim 1, wherein the foremost lens subgroup G1F in the 1st lens group has a negative lens and a positive lens cemented into a single piece of composite lens, and the large-aperture-ratio inner-focusing telephoto zoom lens has an optical property that satisfies requirements as follows:

$$-20.0 < f11/fw < -9.5 \quad (2)$$

where f11 is a focal length of the foremost lens subgroup G1F.

3. A large-aperture-ratio inner-focusing telephoto zoom lens according to claim 2, wherein the rear lens subgroup G1R in the 1st lens group has one negative lens and two positive lenses in series, and the large-aperture-ratio inner-focusing telephoto zoom lens has an optical property that satisfies requirements as follows:

$$75.0 < R1R < 140.0 \quad (3)$$

where R1R is a curvature of radius of a front surface of the concave lens closer to the subject.

4. A large-aperture-ratio inner-focusing telephoto zoom lens according to claim 1, wherein the foremost lens subgroup G1F in the 1st lens group has a negative lens and a positive lens cemented into a single piece of composite lens, and the large-aperture-ratio inner-focusing telephoto zoom lens has an optical property that satisfies requirements as follows:

$$9.0 < |f11|/fw < 20.0 \quad (4)$$

where f11 is a focal length of the foremost lens subgroup G1F.

5. A large-aperture-ratio inner-focusing telephoto zoom lens according to claim 1, wherein the large-aperture-ratio telephoto zoom lens has an optical property that satisfies requirements as follows:

$$62.0 < vn1 < 100 \qquad (5)$$

where vn1 is an Abbe's number of the convex lens of the foremost lens subgroup G1F in the 1st lens group.

6. A large-aperture-ratio inner-focusing telephoto zoom lens according to claim 1, wherein the large-aperture-ratio inner-focusing telephoto zoom lens includes more than one convex lenses belonging to the 3rd and 4th lens groups, and at least one of the convex lenses has an optical property that satisfies requirements as follows:

$$62.0 < v < 100 \qquad (6).$$

7. A large-aperture-ratio inner-focusing telephoto zoom lens according to claim 1, wherein the large-aperture-ratio inner-focusing telephoto zoom lens has an aperture stop located in the 4th lens group.

* * * * *